United States Patent [19]

Satoh et al.

[11] Patent Number: 4,578,797

[45] Date of Patent: Mar. 25, 1986

[54] ASYNCHRONOUS CONNECTING DEVICE

[75] Inventors: Takane Satoh; Yoichi Tan, both of Kanagawa, Japan

[73] Assignee: Fuji Xerox Co., Ltd., Tokyo, Japan

[21] Appl. No.: 513,584

[22] Filed: Jul. 14, 1983

[30] Foreign Application Priority Data

Jul. 14, 1982 [JP] Japan ................. 57-121228

[51] Int. Cl.⁴ ........................................... H04B 14/04
[52] U.S. Cl. ........................................ 375/25; 370/84
[58] Field of Search ................. 375/25, 106, 107, 108, 375/118; 370/100, 102, 84, 79; 328/151

[56] References Cited

U.S. PATENT DOCUMENTS

| 3,665,405 | 5/1972 | Sanders et al. | 370/84 |
| 3,855,422 | 12/1974 | Cadiou et al. | 370/84 |
| 3,867,579 | 2/1975 | Colton et al. | 370/102 |
| 3,984,641 | 10/1976 | Ruyter | 370/102 |
| 4,021,616 | 5/1977 | Betts | 370/102 |
| 4,310,922 | 1/1982 | Lichtenberger et al. | 370/91 |
| 4,371,962 | 2/1983 | Zeitraeg | 375/106 |
| 4,430,745 | 2/1984 | Betts | 375/25 |
| 4,453,259 | 6/1984 | Miller | 375/106 |

Primary Examiner—Robert L. Griffin
Assistant Examiner—Stephen Chin
Attorney, Agent, or Firm—Sughrue, Mion, Zinn, MacPeak and Seas

[57] ABSTRACT

For coupling a digital signal between two asynchronous transmission paths, an asynchronous connecting device includes a serial-to-parallel converter for converting the digital signal into parallel words, a first latch for latching the parallel words at a rate synchronized to the first transmission path, a second latch for latching the output of the first latch at a rate synchronized to the second transmission path, and a parallel-to-serial converter for converting the output of the second latch into a serial digital signal to be transmitted along the second transmission path. It is preferable that the sampling rate of the second latch be higher than that of the first latch, and it is also possible to smooth the second latch output prior to converting it to serial data.

8 Claims, 10 Drawing Figures

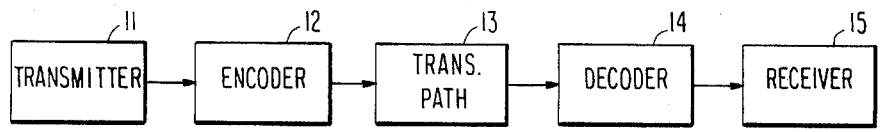
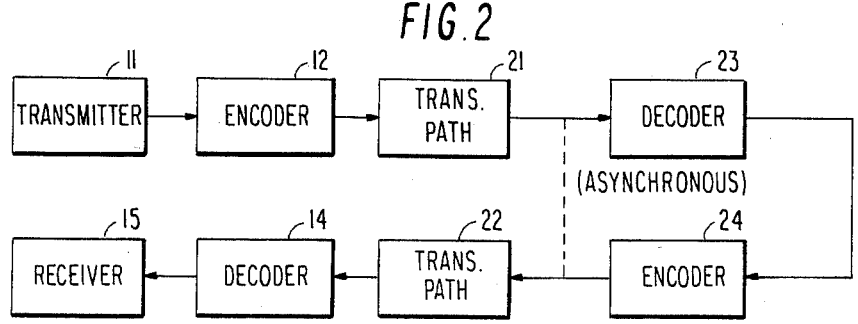
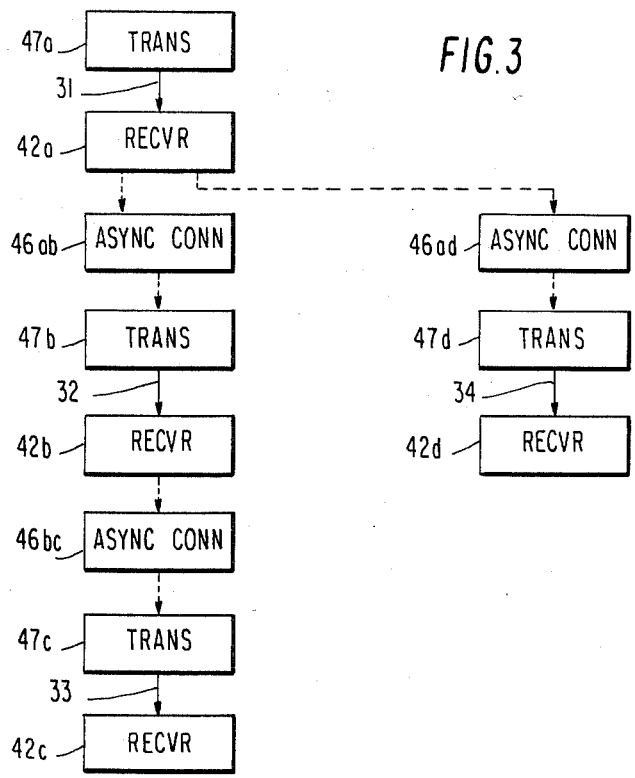

4,578,797

ASYNCHRONOUS CONNECTING DEVICE

BACKGROUND OF THE INVENTION

This invention relates to an asynchronous connecting device for a communications system in which an analog signal is transmitted after being converted into a digital signal.

A digital transmission system is superior to an analog transmission system in that the former is more economical and provides better signal transmission quality than the latter. As semiconductor techniques, such as LSI techniques, and digital technology have advanced, it has become increasingly common to transmit a digital signal instead of an analog signal. This tendency is significant, since a variety of codecs (encoder-decoders) for pulse code modulation are commercially available.

When it is necessary to transmit an analog signal, such as a voice signal, in a digital mode, the analog signal is first pulse-code-modulated by an encoder. The resultant PCM signal is supplied, as a digital signal of 64 kbps (kilo-bits/sec) for instance, to the transmission system. The transmission systems can be classified into a first group of transmission systems in which transmission paths are connected to one another in a synchronous manner, and a second group of transmission systems in which transmission paths are connected to one another in an asynchronous manner.

FIG. 1 shows the essential parts of a communications system according to the first type. The analog output of a transmitter 11 is applied to an encoder 12 where it is sampled and quantized, and is then encoded according to the obtained amplitude, to provide a digital signal. The digital signal thus provided is transmitted over a digital transmission path 13. For instance, a transmission clock signal and a byte clock signal are transmitted, as a PCM signal, through the digital transmission path. The digital signal, being synchronized, is decoded into an analog signal by a decoder 14. The analog signal thus obtained is supplied to a receiver 15 for reproducing the voice data.

FIG. 2 shows the essential parts of a communications system according to the second type. In this communications system, two digital transmission paths 21 and 22 are asynchronously connected to each other. In this case, the digital signal which is transmitted from one digital transmission path 21 is decoded into an analog signal by a decoder 23, and the analog signal is then encoded by an encoder 24. This communications system suffers from the following difficulties:

(1) A decoding and coding operation must be carried out at the connecting point of the transmission paths, and the manufacturing cost of the communications system is increased accordingly; and (2) The S/N ratio is decreased, since the quantization distortions or noises, which are formed when the analog signal is sampled and quantized, are accumulated to thereby increase the noise.

If the decoder 23 and the encoder 24 are eliminated and the transmission path 21 is connected directly to the transmission path 22, then the serial data bits and the transmission clock signals may overlap or be partially lost. Therefore, in the decoder 14 on the signal receiving side, the byte clock signals will not be synchronized, so that the analog signal, e.g. a voice signal, may be reproduced as a completely different signal. Thus, asynchronously connectng the transmission paths without using a codec lowers the transmission quality, and it is therefore difficult from a practical standpoint to use such communications systems.

SUMMARY OF THE INVENTION

In view of the foregoing, an object of this invention is to provide an asynchronous connecting device which can eliminate the codec at the junction of the transmission paths and which can minimize the degradation of transmission quality.

The foregoing and other objects of the invention are achieved by the provision of an asynchronous connecting device in which, when a digital signal is transmitted through at least two transmission systems which are asynchronous, with the frequency difference between the transmission speeds thereof being in a certain allowable range, overlapping or loss of data words (or bytes) is allowed, and analog data such as voice signals are reproduced on the signal receiving side with high quality.

BRIEF DESCRIPTION OF THE DRAWINGS

This invention will now be described with reference to the accompanying drawings, in which:

FIG. 1 is a block diagram showing the arrangement of a conventional PCM communications system;

FIG. 2 is a block diagram showing the arrangement of a conventional communications system in which the asynchronous transmission paths are connected to each other through a codec;

FIG. 3 is a connecting diagram showing a communications system according to one embodiment of this invention;

DETAILED DESCRIPTION OF THE PREFERRED EMBODIMENTS

Figure 4:
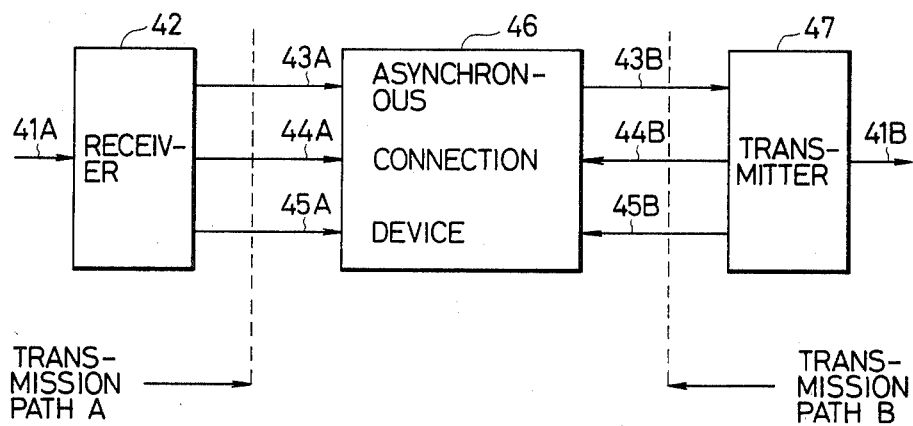
FIG. 4 is a block diagram showing the arrangement of an asynchronous connecting section in the communications system of FIG. 3.

FIG. 3 shows a communications system according to this invention. In this communications system, four transmission paths 31, 32, 33 and 34 are asynchronously connected to one another as indicated by the broken lines in FIG. 3. Each transmission path 31, 32, 33 or 34 connects a transmitter 47a, 47b, 47c or 47d to a respective receiver 42a, 42b, 42c or 42d. Within each section an asynchronous connecting device, for example 46ab, connects the receiver 42a to the transmitter 47b. FIG. 4 shows the configuration of each connecting section. A PCM data signal 41a is supplied through one transmission path (hereinafter referred to as "a transmission path A") to a receiver 42 at one end of the path A. The receiver 42 reproduces a digital signal 43A representing voice data or the like, a transmission clock signal 44A and a byte clock signal 45A derived from the PCM data 41a. The transmission clock signal 44A is a clock signal which is bit-synchronous with the digital signal 43A. The byte clock signal 45A is a clock signal with words (or bytes) as units representing the sampled value of analog data such as voice data.

Figure 5:
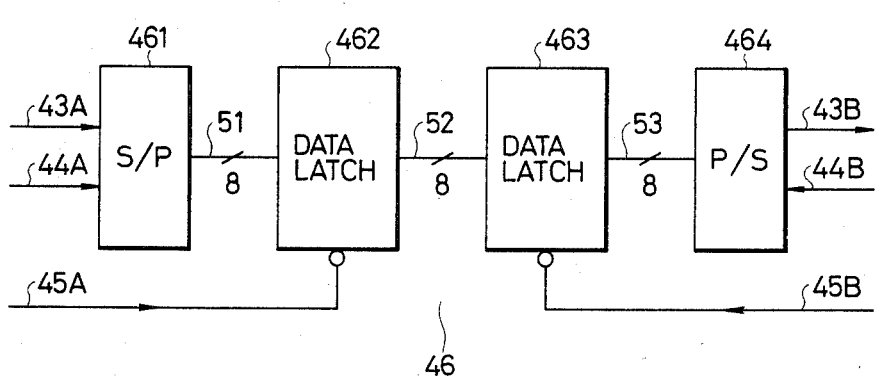
FIG. 5 is a block diagram showing in more detail the asynchronous connecting device of FIG. 4.

These three signals 43A, 44A and 45A are supplied to an asynchronous connecting device 46, the arrangement of which is shown by way of example in FIG. 5. Each of the asynchronous connecting devices 46ab, 46ad and 46bc have the structure of the asynchronous connecting device 46. The digital signal 43A and the transmission clock signal 44A are supplied to a serial-parallel converter 461, where they are converted into an 8-bit parallel signal 51 with each sampled value being quantized. The signal 51 is applied to a first data latch circuit 462, where it is latched with the timing which is determined by the byte clock signal 45A. The latched parallel signal 52 is supplied to a second data latch circuit 463. The second data latch circuit 463, receiving a byte clock signal 45B from a transmitter 47 at one end of another transmission path (hereinafter referred to as "a transmission path B") which is connected to the transmission path A in FIG. 4, latches the parallel signal 52 with a timing which is determined by the byte clock signal 45B. The transmitter 47 on the transmission path B performs the function of reproducing a transmission clock signal 44B and the byte clock signal 45B from a PCM data 41B which is transmitted over the transmission path B.

The parallel signal 53 which is latched by the second latch circuit 463 is supplied to a parallel-serial converter 464, which outputs a serial digital signal 43B synchronous with the transmission clock signal 44B. The digital signal 43B is applied to the transmitter 47, so that the PCM data 41B including the voice data, etc. from the transmission path A is supplied to the transmission path B. Conditions required for connecting the asynchronous connecting device to the receiver 42 or the transmitter 47 present significant problems, and are similar to those which have been established between data terminal equipment (DTE) and data circuit terminating equipment (DCE). One example of the required conditions is as provided by CITT Advice X.21.

Figure 6A:
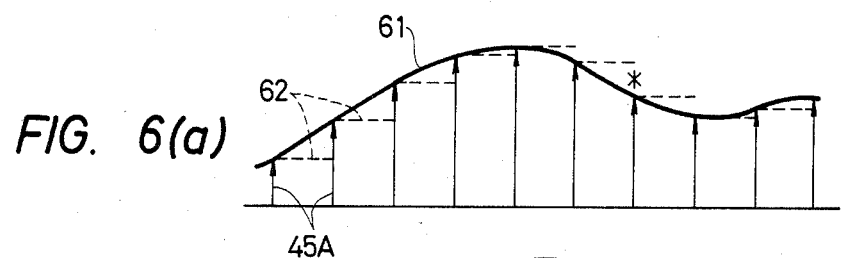
FIGS. 6A–6C are waveform diagram for a description of the variations of analog data which occur with the use of the asynchronous connecting device.
Figure 6B:
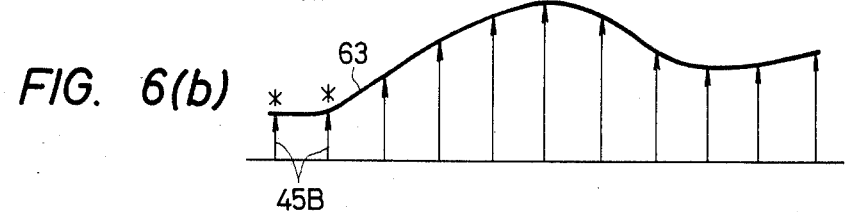
Figure 6C:
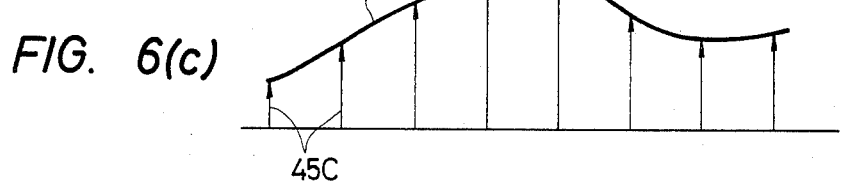

FIG. 6 is a diagram for describing how voice data or the like is varied by the use of the asynchronous connecting device. It is assumed that the waveform of an original analog signal transmitted over the transmission path A is as indicated at 61 in FIG. 6(a). The waveform 61 is sampled with the aid of the byte clock signal 45A provided for the transmission path A, and the sampled value is held by the first data latch circuit 462 until the next byte clock signal 45 occurs, as indicated by the broken line 62. Since the transmission path A is asynchronously connected to the transmission path B, the speed of the byte clock signal 45A for the transmission path A is slightly different from that of the byte clock signal 45B for the transmission path B. It is assumed that the speed of the byte clock signal 45B for the transmission path B is slightly higher than that of the byte clock signal 45A for the transmission path A. In this case, the second data latch circuit 463 latches the parallel signal 52 with the period of the byte clock signal 45B as shown in FIG. 6(b), so that the digital signal 43B is formed. Accordingly, in this case, an analog signal having a waveform as indicated at 63 is reproduced on the side of the transmission path B. When, in contrast, the speed of the byte clock signal 45B is lower than that of the byte clock 45A, the analog signal which is reproduced on the side of the transmission path B is similar to to waveform 64 in FIG. 6(c).

In the case of FIG. 6(b), the data overlaps at the positions indicated by the asterisks (*), and in the case of FIG. 6(c) the data indicated by the asterisk (*) in FIG. 6(a) is lost. It is assumed that the transmission clock signals in the transmission paths A and B have a frequency of 64 KHz, and that the frequency stability is on the order of $10^{-5}$. In this case, the data overlaps or is lost once each second. From a practical viewpoint, this data slipping phenomenon can be disregarded in the ordinary reproduction of analog data such as voice data. Sometimes, depending on the content of communication data, the loss of data causes trouble, but the overlapping of data is of no consequence, and the example shown in FIG. 6(b) causes no difficulty. Thus, it is sufficient to make the frequency of the transmission clock signal on the signal receiving side higher than that of the transmission clock signal on the signal transmitting side. It goes without saying that, even if the content of communication data is other than voice data, the S/N ratio of the analog signal can be increased by smoothing the reproduced byte units of data. If a given data is represented by X(n) and data before and after the given data are represented, respectively, by X(n−1) and X(n+1), then, e.g., the data X(n) can be smoothed according to the following expression:

$$[X(n-1)+2X(n)+X(n-1)]/4$$

This smoothing operation can be readily achieved by using a commercially available arithmetic logic unit.

Figure 7:
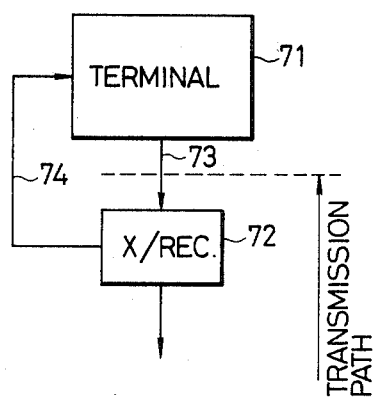
FIG. 7 is a diagram showing the signal flow path between a terminal and a transceiver in a conventional communications system.
Figure 8:
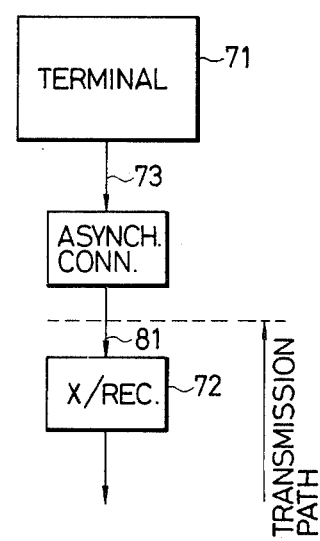
FIG. 8 is a diagram showing the signal flowpath between the terminal and the transceiver in the case where the asynchronous connecting device of the invention is employed.

As is apparent from the above description, according to the invention, the transmission paths are asynchronously connected to each other, and it is therefore unnecessary to maintain a synchronous relationship between the terminals of the transmission paths. Accordingly, when a terminal 71 transmits a digital signal 73 to a transceiver 72 on the transmission path side as shown in FIG. 7, it is unnecessary for the transceiver 72 to apply a synchronizing transmission clock signal to the terminal 71. Accordingly, when an asynchronous connecting device is arranged between the terminal 71 and the transceiver 72 as shown in FIG. 8, a digital signal 81 of high quality can be applied to the transceiver 72. Therefore, each terminal can transmit a digital signal by using its own clock signal, the communications system can be simplified, and the terminals can be easily connected.

According to this invention, it is unnecessary to provide a codec at the asynchronous connecting section, and the communications system can therefore be built at lower cost.

We claim:

1. In a communications system of the type wherein a digital signal is transmitted along a first path with a first clock rate and along a second path with a second clock rate asynchronous with said first clock rate, an asynchronous connecting device for coupling said digital signal between said first and second paths, said connecting device comprising:
   first sampling means for receiving said digital signal from said first path and sampling said digital signal at a first sampling rate synchronized with said first clock rate; wherein said first sampling means comprises a serial-to-parallel converter for receiving said digital signal from said first path and converting said digital signal into word units, and a first latch circuit for receiving and latching said word units in response to a clock signal at said first sampling rate; and second sampling means for receiving the output of said first sampling means and sampling said output at a second sampling rate synchronized with said second clock rate; wherein said second sampling means comprises a second latch circuit for receiving and latching the output of said first latch circuit in response to a second sampling signal at said second sampling rate, and a parallel-to-serial converter for converting the output of said second latch circuit into a serial digital signal having said second clock rate.

2. A connecting device as claimed in claim 1, further comprising smoothing means for smoothing said second latch output prior to conversion by said parallel-to-serial converter.

3. A connecting device as claimed in claim 1, wherein said second sampling rate is higher than said first sampling rate.

4. A connecting device as claimed in claim 3, wherein the frequency of said second clock signal is higher than the frequency of said first clock signal.

5. In a communications system of the type wherein a digital signal is transmitted along a first path with a first clock rate and along a second path with a second clock rate asynchronous with said first clock rate, a method of asynchronously connecting said digital signal between said first and second paths, said method comprising the steps of:

sampling said digital signal from said first path at a first sampling rate synchronized with said first clock rate to provide a first sampling means output; wherein said first sampling step comprises the steps of receiving a serial digital signal from said first path at said first clock rate and converting said serial digital signal to parallel words, and latching said parallel words in response to a first sampling signal at said first sampling rate; and sampling said first sampling means output at a second sampling rate synchronized with said second clock rate to provide a second sampling means output, said second sampling means output being coupled to said second path; wherein said second sampling step comprises the steps of latching said first sampling means output in response to a second sampling signal at said second sampling rate to provide a second latch output comprising parallel digital words, and converting said second latch output into a serial digital signal having said second clock rate.

6. A method as claimed in claim 5, further comprising the step of smoothing said second latch output prior to converting said second latch output into said serial digital signal having said second clock rate.

7. A method as claimed in claim 5, wherein said second sampling rate is higher than said first sampling rate.

8. A method as claimed in claim 7, wherein the frequency of said second clock signal is higher than the frequency of said first clock signal.

* * * * *